(12) United States Patent
Esman et al.

(10) Patent No.: US 12,095,511 B1
(45) Date of Patent: Sep. 17, 2024

(54) MULTIPLE-SENSITIVITY OPTICAL PHASE MODULATOR

(71) Applicant: Rockwell Collins, Inc., Cedar Rapids, IA (US)

(72) Inventors: Daniel J. Esman, Ellicott City, MD (US); Ronald D. Esman, Mclean, VA (US); Oliver S. King, Frederick, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 154 days.

(21) Appl. No.: 17/848,923

(22) Filed: Jun. 24, 2022

(51) Int. Cl.
H04B 10/548 (2013.01)

(52) U.S. Cl.
CPC .................. H04B 10/548 (2013.01)

(58) Field of Classification Search
CPC .................................... H04B 10/548
USPC ......................................... 398/188
See application file for complete search history.

(56) References Cited

U.S. PATENT DOCUMENTS

| 7,808,618 | B1 | 10/2010 | Tawney et al. | |
|---|---|---|---|---|
| 7,898,464 | B1 | 3/2011 | Anderson et al. | |
| 9,395,596 | B2 | 7/2016 | Chimot et al. | |
| 9,647,426 | B1* | 5/2017 | Fish | H01S 5/5009 |
| 9,954,638 | B2* | 4/2018 | Sugiyama | H04B 10/2572 |
| 10,128,957 | B2* | 11/2018 | Welch | H04B 10/516 |
| 10,222,676 | B2* | 3/2019 | Wen | H04B 10/505 |
| 10,790,911 | B2* | 9/2020 | Li | H04B 10/616 |
| 11,156,894 | B2 | 10/2021 | Cho et al. | |
| 11,287,722 | B2 | 3/2022 | Jackel et al. | |
| 2021/0194586 | A1* | 6/2021 | Middlebrook | H04B 10/25759 |
| 2022/0100047 | A1 | 3/2022 | Gowda et al. | |

FOREIGN PATENT DOCUMENTS

| EP | 2403165 A1 * | 4/2012 | ............... H04B 1/28 |
|---|---|---|---|
| WO | 2021068073 A1 | 4/2021 | |

OTHER PUBLICATIONS

Lee et al; Multiple p-n junction subwavelength gratings for transmission-mode electro-optic modulators; Apr. 2017; Nautre.com; pp. 1-8. (Year: 2017).*
Lee et al; Multiple p-n junction subwavelength gratings for transmission-mode electro-optic modulators; Apr. 2017; Nature.com; pp. 1-8. (Year: 2017).*

(Continued)

Primary Examiner — Amritbir K Sandhu
(74) Attorney, Agent, or Firm — Suiter Swantz IP

(57) ABSTRACT

A system and related method for multiple-sensitivity optical phase modulation splits an optical carrier generated by a photonic source into at least two copies and directs the copies (e.g., via optical circulators or polarization rotators) to an electro-optical (EO) phase modulator such that the phase modulator phase-modulates each optical copy according to a received radio frequency (RF) signal of interest based on characteristics distinct to each optical copy (e.g., optical path direction, signal polarization) that provide for phase modulation of each optical copy at a different sensitivity voltage. The variably modified optical copies are directed to a photonic processor for further signal processing in the optical domain.

11 Claims, 9 Drawing Sheets

(56) References Cited

OTHER PUBLICATIONS

Li et al; High-speed robust polarization modulation for quantum key distribution; Oct. 2019; Optic Letters; pp. 1-4 (Year: 2019).
Zou et al; Polarization-Insensitive Phase Modulators Based on an Embedded Silicon-Graphene-Silicon Waveguide; Jan. 2019; MDPI; pp. 1-8 (Year: 2019).

* cited by examiner

FIG. 6A

614 — Modulating, via the EO phase modulator, a first phase of the first optical input according to the RF input signal and the first modulation sensitivity voltage 616 — Modulating, via the EO phase modulator, a second phase of the second optical input according to the RF input signal and the second modulation sensitivity voltage 618 — Directing the modulated first optical input and the modulated second optical input to a photonic processor

FIG. 6B

MULTIPLE-SENSITIVITY OPTICAL PHASE MODULATOR

GOVERNMENT SUPPORT

This technology was developed with U.S. government support under contract number NRO000-21-C-0297 awarded by the National Reconnaissance Office. The U.S. government has certain rights in this invention.

BACKGROUND

Fiber optics provide advantages for remoting antennas and for processing received radio frequency (RF) signals. Related photonic processing examples include, but are not limited to, beamforming for electronically steered arrays (ESA) and up/down frequency conversion. The basic photonic system includes optical and RF inputs, an optical modulator, a photonic processor, and photodiodes. For example, the optical modulator (e.g., electro-optical (EO) converter) varies one or more aspects of a laser or other optical input (e.g., intensity, amplitude, and/or phase) based on a received (analog) RF input, resulting in an optical output signal. Photonic processors can transport or distribute the optical output signal or perform RF frequency conversion (or any number of other mathematical operations) on the optical output signal as needed. Photodiodes (e.g., optical-electrical (OE) converters) convert the optical output signal into an RF output signal in the electrical domain by producing current in proportion to the optical intensity of the received output signal.

Some photonic processors may require multiple copies of a given RF input signal, each copy reflecting a different level of optical modulation. For example, given RF input signals (A, B) and two desired outputs (A+B, 2A−3B), four signals in the optical domain would be required: A, B, 2A, and 3B. Because there is no known way to arbitrarily amplify/attenuate optical phase modulation, the RF input signal(s) must be first split and amplified or attenuated before being fed to the photonic processor inputs. However, this approach has many drawbacks. For example, RF splitters may introduce excess loss to an input signal. Further, RF splitters are frequency-dependent and thus may not be able to maintain consistent output phases and/or amplitudes over a frequency range. Finally, RF splitters require additional connections that compound losses and frequency dependence. If, for example, an RF input signal is split and both copies fed to optical phase modulators, two phase modulators are required (which may not be perfectly matched over a frequency range). Further, both phase modulators require their own optical inputs, which in turn requires additional optical routing (and results in additional loss).

SUMMARY

In a first aspect, a system for dual-sensitivity optical phase modulation is disclosed. In embodiments, the system generates an optical carrier via a laser or like photonic source. The optical carrier is split into multiple copies; sensitivity controllers impart onto each copy a different modulation sensitivity voltage. The system includes an electro-optical (EO) phase modulator for phase-modulating each optical carrier copy according to a received radio frequency (RF) signal of interest and according to the imparted modulation sensitivity voltage. The modulated optical carrier copies are directed to a photonic processor for further processing.

In some embodiments, the sensitivity controllers are optical circulators configured for directing the optical carrier copies through the EO phase modulator in different or opposing optical path directions (and for directing the modulated carrier copies in an optical path direction opposite the unmodulated optical carriers to the photonic processors), each optical path direction associated with a different modulation sensitivity voltage.

In some embodiments, the sensitivity controllers include polarization rotators and/or polarization beamsplitters. For example, a polarization rotator may configure an optical carrier input as a combined optical channel, carrying along a single optical fiber, channel, or line two or more optical carrier components each associated with a different polarization state (e.g., horizontal/vertical). The EO phase modulator modulates each optical carrier component of the combined optical channel according to its particular polarization state, each polarization state associated with a different modulation sensitivity voltage. Polarization beamsplitters separate each modulated combined optical channel into its modulated optical carrier components, which are directed to the photonic processors.

In some embodiments, the system is a hybrid quad-sensitivity system wherein the optical carriers are first directed through polarization rotators to generate combined optical channels incorporating carrier components with multiple polarization states, each combined optical channel sent by optical circulators through the EO phase modulator in a different or opposing optical path direction. For example, each optical carrier component is phase-modulated according to its individual polarization state in addition to the optical path direction of its combined optical channel. The polarization beamsplitters output four optical outputs, each phase-modulated according to the RF input signal and a different modulation sensitivity voltage.

In some embodiments, the system includes the photonic processor and photodiodes for converting the processed modulated optical outputs into modulated electrical-domain output signals.

In a further aspect, a method for dual-sensitivity optical phase modulation is also disclosed. In embodiments, the method includes providing, via a laser or other photonic source, an optical carrier. The method includes splitting the optical carrier into at least a first and second optical input. The method includes respectively imparting to the first and second optical input a first and second modulation sensitivity voltage, the second voltage different than the first voltage. The method includes receiving, via an electro-optical (EO) phase modulator, RF input signals of interest. The method includes modulating, via the EO phase modulator, a phase of the first optical input according to the RF input signal and the first modulation sensitivity voltage. The method includes modulating, via the EO phase modulator, the second optical input according to the RF input signal and the second modulation sensitivity voltage. The method includes directing the modulated first and second optical inputs to a photonic processor for further processing.

In some embodiments, the first and second modulation sensitivity voltages are based on different or opposing optical path directions of the first and second optical inputs through the EO phase modulator.

In some embodiments, the first and second modulation sensitivity voltages are based on different polarization states (e.g., horizontal/vertical) of the first and second optical inputs. For example, the method includes splitting an optical input into optical carrier components having different polarization states but sent through the EO phase modulator as a combined optical channel.

In some embodiments, the method includes separating each modulated combined optical channel into its modulated optical carrier components via a polarization beamsplitter.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 6A and 6B are flow diagrams illustrating a method for multiple-sensitivity optical phase modulation according to example embodiments of this disclosure;

DETAILED DESCRIPTION

Figure 1:
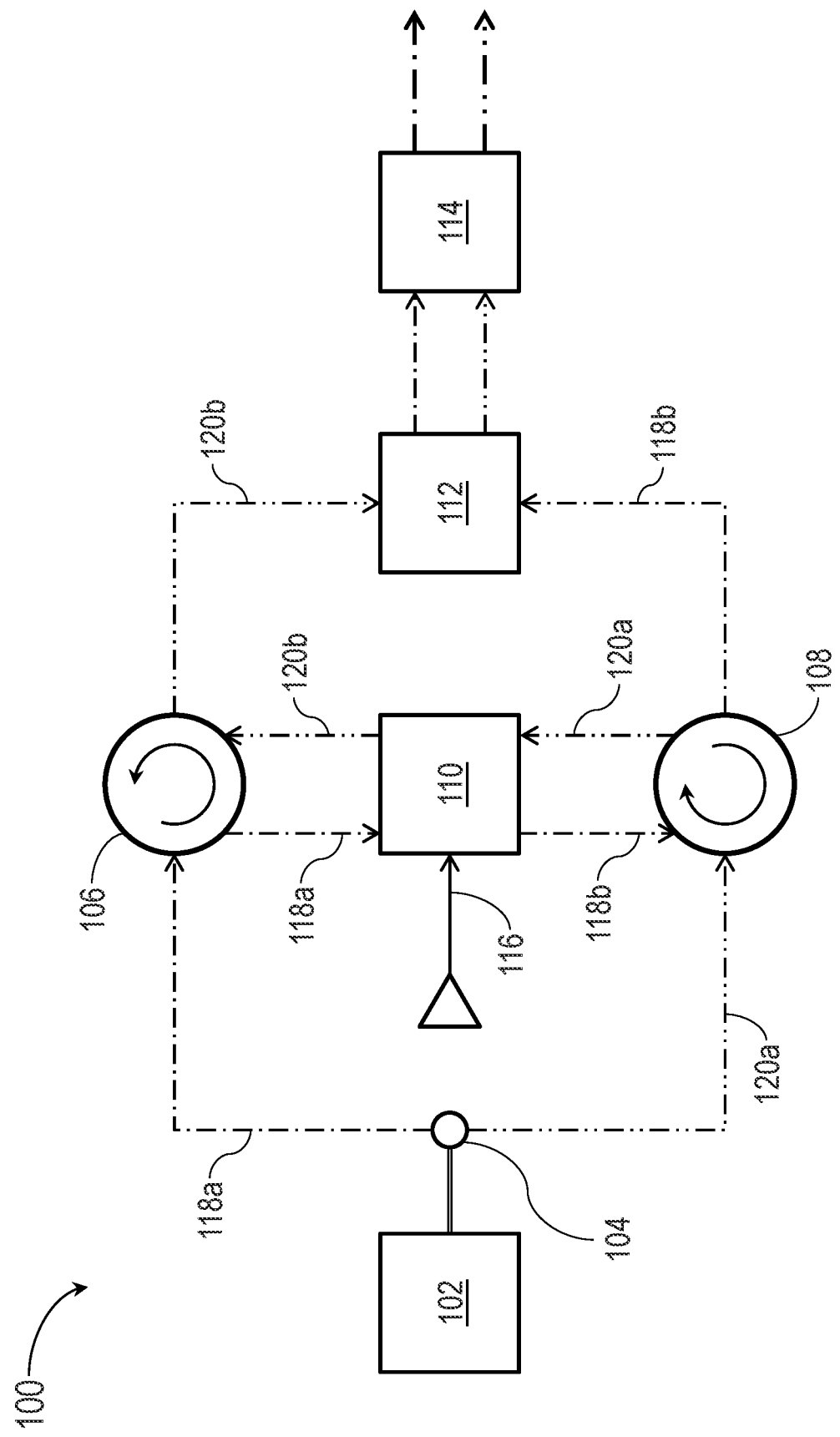
FIG. 1 is a block diagram illustrating a multiple-sensitivity optical phase modulator system based on directional dependencies according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to systems and methods for creating multiple optical copies of an RF input signal using a single EO phase modulator. For example, each of two (or three, or more) optical copies of the RF input signal may correspond to a different modulator sensitivity to the RF input. In embodiments, the sensitivity of an EO modulator to electrical-domain (e.g., RF) input signals is equivalent to the voltage required to impart a π phase shift upon the optical carrier, and may accordingly be referred to as Vπ. The lower the Vπ, the greater the sensitivity of the modulator to the RF input signal.

In embodiments, achieving multiple sensitivities through a single EO phase modulator may be achieved in a variety of configurations based on different modulator sensitivity dependencies, e.g., relative directions of optical and RF inputs; optical polarizations; optical wavelengths; cross-section overlap of electrical and optical fields; and/or electrical/optical field overlap length. Some sensitivity dependencies provide unique advantages, e.g., depending upon the desired output or upon the chosen distinguishing characteristics.

Referring to FIG. 1, a system 100 for multiple-sensitivity optical phase modulation is shown. The system 100 may include a photonic source 102, splitter 104, sensitivity controllers 106, 108, electro-optical (EO) phase modulator 110, photonic processor 112, and photodiodes 114.

In embodiments, the EO phase modulator 110 of system 100 may receive an RF input signal 116 and produce multiple optical copies of the RF input signal according to multiple sensitivities based on directional dependency of the RF input signal and/or an optical carrier generated by the photonic source 102 (e.g., a mode-locked laser (MLL) or other pulsed laser source; a continuous-wave (CW) laser). For example, the optical carrier generated by the photonic source 102 may be duplicated by the splitter 104, e.g., split into two identical copies 118a, 120a.

In embodiments, both copies of the optical carrier may pass through both sensitivity controllers 106, 108, but in different directions, and isolated from each other by the sensitivity controllers. For example, the two sensitivity controllers 106, 108 may be optical circulators configured for two different and opposing directions, e.g., left-to-right/right-to-left, clockwise/counterclockwise. In embodiments, each of the two opposing directions may be associated with a different modulator sensitivity. For example, the optical copy 118a may travel in a left-to-right direction relative to the OE phase modulator 110, received first by the optical circulator 106 and directed through the OE phase modulator where the optical copy is modulated (118b) according to the RF input signal 116 and a modulator sensitivity voltage $V\pi_{L \to R}$. The modulated optical copy 118b may then be directed by the optical circulator 108 to the photonic processor 112 (e.g., for further signal processing and/or operations). Similarly, the optical copy 120a may travel in a relative right-to-left direction: first received by the optical circulator 108 and directed through the OE phase modulator 110, thereby modulated (120b) according to the RF input signal 116 and a modulator sensitivity voltage $V\pi_{R \to L}$ ($V\pi_{R \to L} \neq V\pi_{L \to R}$), and finally directed by the optical circulator 106 to the photonic processor 112.

Figure 2:
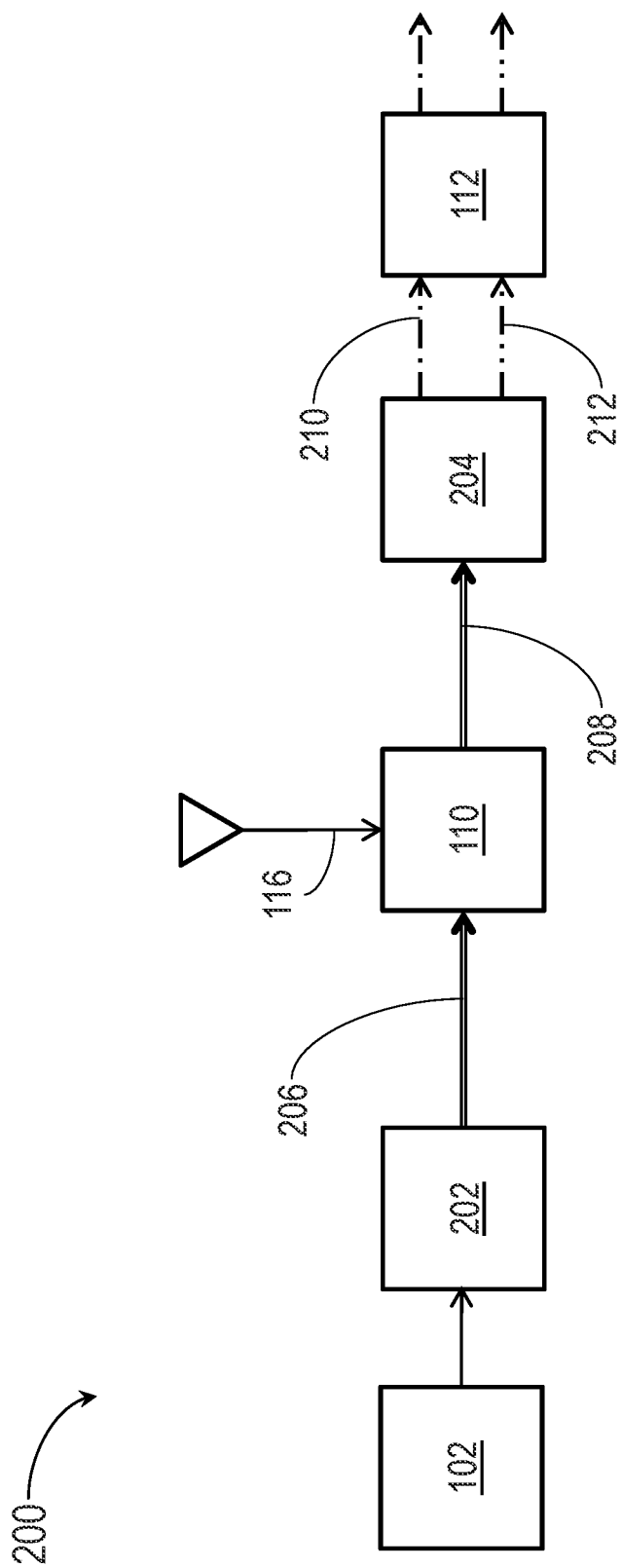
FIG. 2 is a block diagram illustrating a multiple-sensitivity optical phase modulator system based on polarization dependencies according to example embodiments of this disclosure.

Referring now to FIG. 2, the system 200 may be implemented and may function similarly to the system 100 for multiple-sensitivity optical phase modulation, except that the system 200 may produce multiple optical copies of the RF input signal 116 based on polarization dependencies.

In embodiments, the sensitivity controllers of the system 200 may include polarization controllers 202, 204 (e.g., polarization rotator 202, polarization beamsplitter 204). For example, the polarization rotator 202 may receive the optical carrier generated by the photonic source 102 and output a vertically polarized optical carrier and a horizontally polarized optical carrier, e.g., sent as a combined optical channel 206 via a single fiber or optical line. The polarization rotator 202 may pass the vertically and horizontally polarized optical carriers of the combined optical channel 206 through the EO phase modulator 110, which may modulate both optical carriers according to the RF input signal 116 but based on different modulator sensitivity voltages, which differ depending on the respective input polarization (e.g., $V\pi_{horiz}$, $V\pi_{vert}$, $V\pi_{horiz} \neq V\pi_{vert}$). The modulated combined optical channel 208 may then be passed (and separated into a modulated vertically-polarized optical carrier 210 and a horizontally-polarized optical carrier 212) by the polarization beamsplitter 204 to the photonic processor 112.

In embodiments, the polarization-dependent system 200 may provide several advantages over the directional-dependent system 100. For example, the polarization-dependent system 200 may be implemented on an application-specific integrated circuit (ASIC). Further, the polarization-dependent system 200 may provide a consistent $\Delta(V\pi_{horiz}, V\pi_{vert})$ across a broad RF frequency range, where with respect to the directional-dependent system 100 shown by FIG. 1, $\Delta$ ($V\pi_{R \to L}$, $V\pi_{L \to R}$) may be relatively low at lower RF input signal 116 frequencies but may increase at higher RF frequencies.

Figure 3:
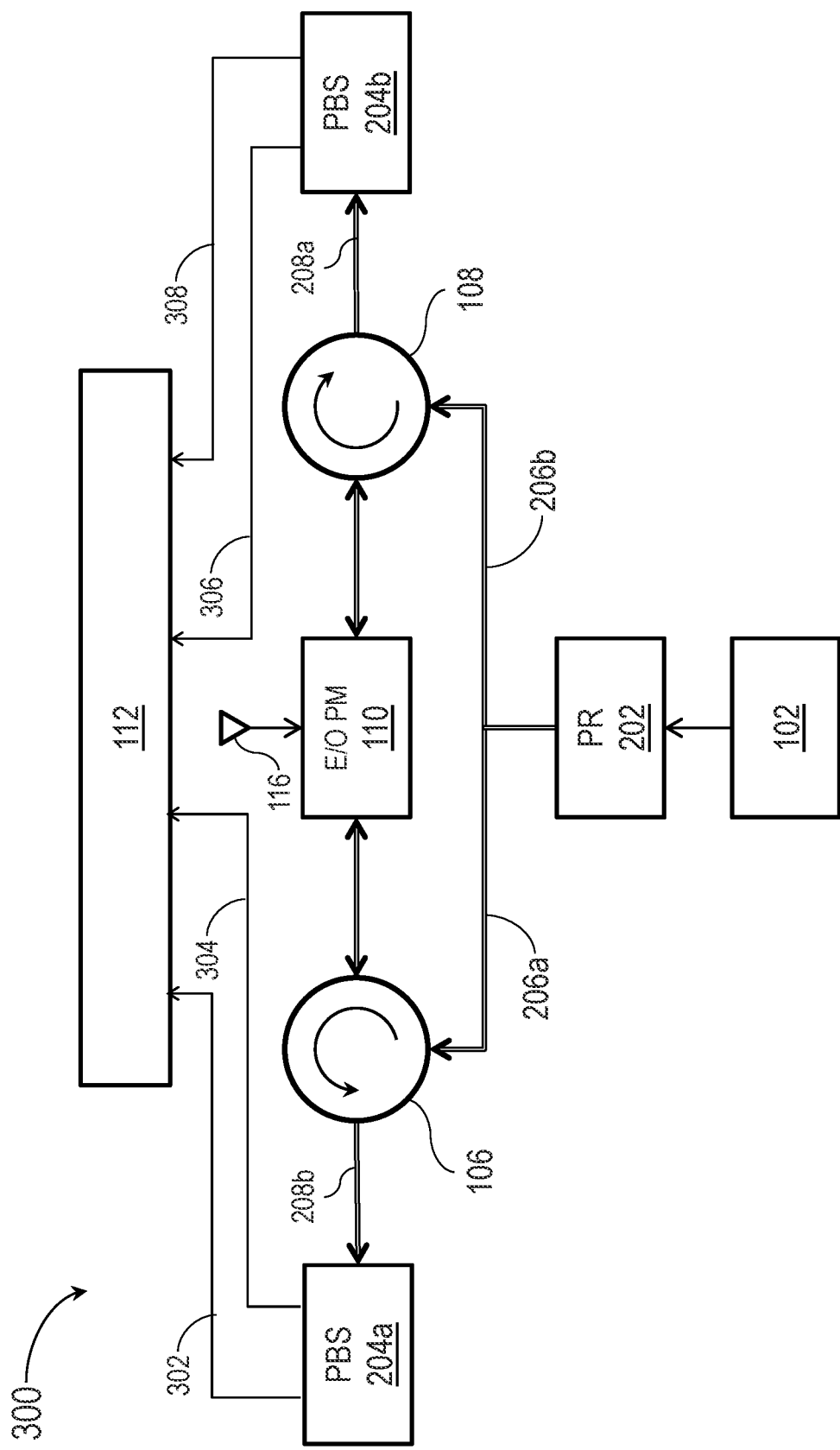
FIG. 3 is a block diagram illustrating a multi-stage hybrid multiple-sensitivity optical phase modulator system incorporating the direction-dependent and polarization-dependent optical phase modulator systems of FIGS. 1 and 2.

Referring now to FIG. 3, a hybrid multiple-sensitivity system 300 is shown.

In embodiments, if more than two modulated output signals are needed, the properties of the directional-dependent system 100 and the polarization-dependent system 200 may be combined. By way of a non-limiting example, the hybrid system 300 may first generate an optical carrier via the photonic source 102, splitting the optical carrier into two or more combined optical channels 206a, 206b via a polarization rotator 202 (each combined optical channel including two or more optical carrier components associated with different polarization states, e.g., horizontal/vertical).

In embodiments, each combined optical channel 206a, 206b may be sent through optical circulators 106, 108 in opposing or different optical path directions, e.g., left-to-right and right-to-left as described above. For example, the combined optical channel 206a may be sent by the optical circulator 106 in a left-to-right direction, whereby the EO phase modulator 110 may phase-modulate each optical carrier component according to the optical path direction and according to the polarization state (e.g., according to modulation sensitivity voltages $V\pi_{[L \to R][horiz]}$, $V\pi_{[L \to R][vert]}$). Similarly, the combined optical channel 206b may be sent by the optical circulator 108 left-to-right, and its optical carrier components phase-modulated by the EO phase modulator 110 according to modulation sensitivity voltages $V\pi_{[R \to L][horiz]}$, $V\pi_{[R \to L][vert]}$).

In embodiments, the phase-modulated combined optical channels 208a, 208b may be sent by the respective optical circulators 108, 106 in their respective optical path directions to polarization beamsplitters 204a, 204b for separation into their modified optical carrier components 302, 304, 306, 308, each phase-modulated according to the RF input signal 116 and a different modulation sensitivity voltage as described above.

Figure 4:
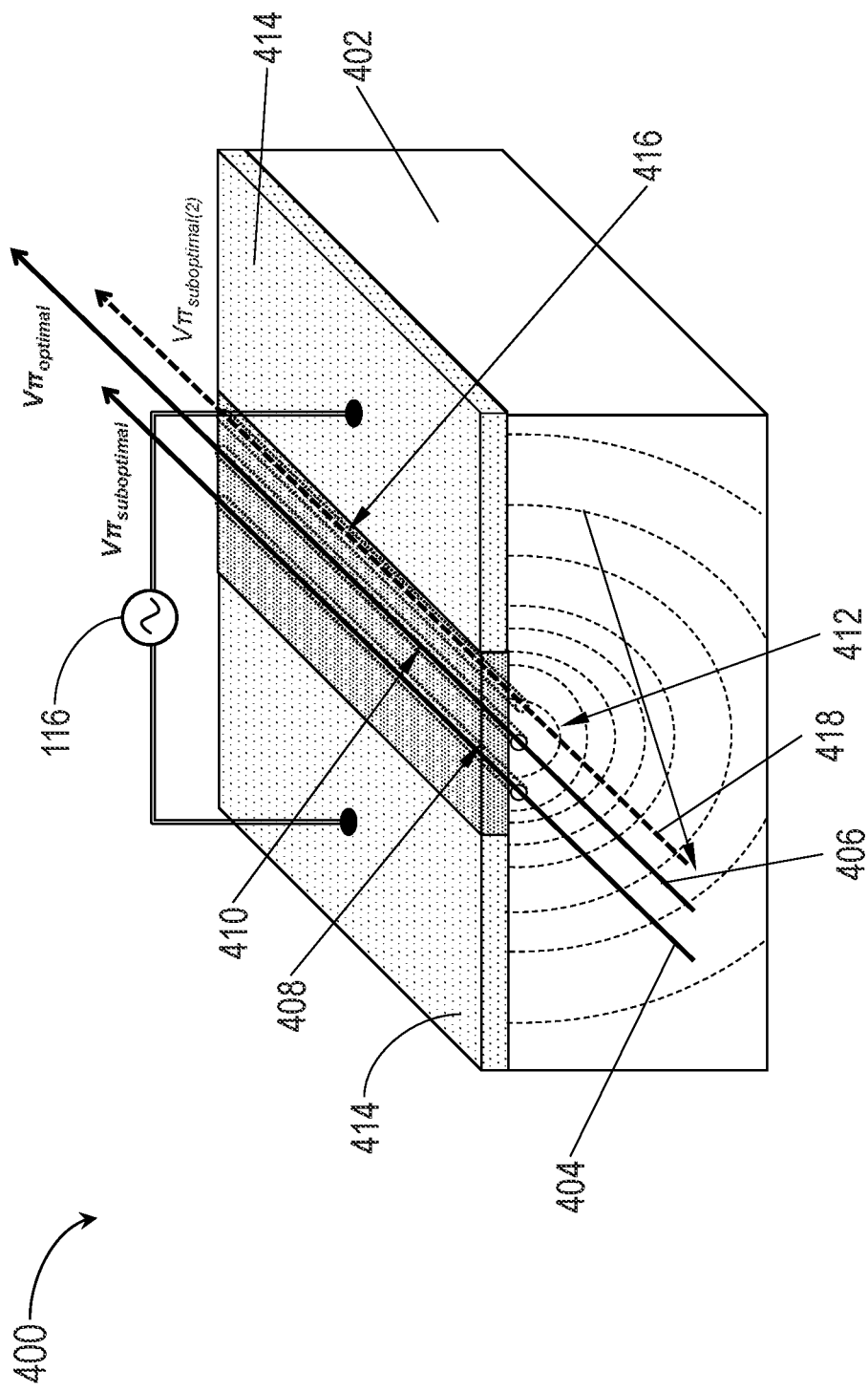
FIG. 4 is a diagrammatic illustration of a multiple-sensitivity optical phase modulator system based on cross-sectional electrical field overlap dependencies according to example embodiments of this disclosure.

Referring now to FIG. 4, the system 400 for multiple-sensitivity optical phase modulation may function similarly to the directional-dependent and polarization-dependent systems 100, 200 of FIGS. 1 and 2, except that the system 400 may incorporate an optical phase modulator 402 wherein the split optical carriers 404, 406 (e.g., generated by the photonic source (102, FIG. 1) and split by the splitter (104, FIG. 1)) is directed by optical modes 408, 410 (e.g., optical waveguides) through a modulating field overlap (e.g., of the electrical field 412 generated by the RF input signal 116 (e.g., via electrodes 414) and the input optical field associated with the split optical carriers) and thereby toward the photonic processor (112, FIG. 1). For example, the optical phase modulator may incorporate bulk or thin film lithium niobate (TFLN) or any other appropriate material.

In embodiments, the optical mode 408 may be placed within the phase modulator 402 to align with a maximum field overlap of the electrical field 412. Similarly, the optical mode 410 may be placed within the phase modulator 402 to align with a sub-optimal field overlap, such that the split optical carriers 404, 406 are phase-modulated according to the RF input signal 116 based on differing sensitivity voltages $V\pi_{optimal}$, $V\pi_{sub-optimal}$, wherein $V\pi_{optimal} < V\pi_{sub-optimal}$. In some embodiments, additional optical modes 416 (e.g., corresponding to additional electrical field overlaps) may be placed within the phase modulator 402 and the optical carrier originating at the photonic source 102 split into additional optical carriers 418. For example, the optical mode 410 may correspond to a first suboptimal mode placement and the optical mode 416 to a second suboptimal mode placement, such that the three split optical carriers 404, 406, 418 may be phase-modulated according to the RF input signal 116 based on three different sensitivity voltages $V\pi_{optimal}$, $V\pi_{suboptimal(1)}$, $V\pi_{suboptimal(2)}$.

Figure 5A:
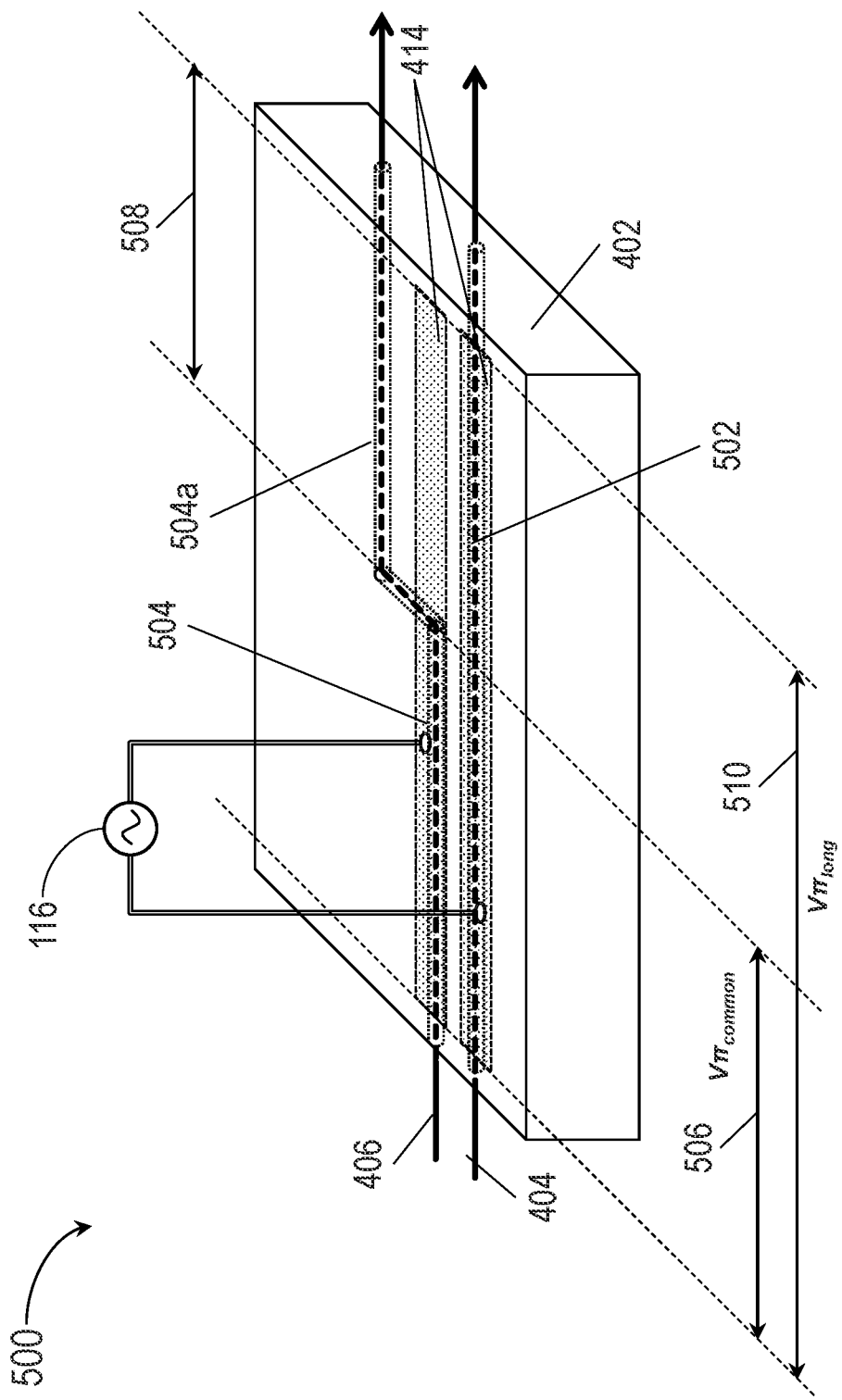
FIGS. 5A and 5B are diagrammatic illustrations of a multiple-sensitivity optical phase modulator system based on electrical field overlap length dependencies according to example embodiments of this disclosure.

Referring now to FIG. 5A, the system 500 for multiple-sensitivity optical phase modulation may function similarly to the cross-sectional field strength dependent system 400 shown by FIG. 4, except that the system 500 may vary sensitivity voltages based on a length of the interaction region where the electrical and optical fields overlap (e.g., as opposed to optical mode transverse placement relative to electrical field strength).

In embodiments, the optical modes 502, 504 may carry the split optical carriers 404, 406 (e.g., between the photonic source (102, FIG. 1) and photonic processor (112, FIG. 1) via the EO phase modulator 402) proximate to the appropriate electric field generated by the electrodes 414 for an optical mode length defining a common interaction region 506. For example, within the common interaction region 506 the electro-optical field interaction may be equivalent for both split optical carriers 404, 406. In embodiments, one optical mode 504 may separate (504a) from the corresponding electric field generated by the electrodes 414 while the first optical mode 502 continues proximate to the electric field generated by the electrodes 414. For example, the first optical mode may continue to interact with the electrical field while the other optical mode 504a experiences no further electro-optical field interaction along a distance 508. For example, the first optical mode 502 and split optical carrier 404 may define a long interaction region 510 defining a greater length of electro-optical field interaction than the common interaction region 506 (which defines the length of electro-optical interaction of the other optical mode 504 and split optical carrier 406). Accordingly, each interaction region 506 (common), 510 (long) may respectively define a modulation sensitivity voltage $V\pi_{long}$, $V\pi_{common}$, wherein $V\pi_{long} < V_{IT}^{common}$.

In some embodiments, the system 500 may incorporate additional optical modes (416, FIG. 4) for carrying additional optical carriers (418, FIG. 4). For example, the additional optical modes 504, 410 may define additional common interaction regions wherein the length of electro-optical field interaction may vary but may in every case be shorter than the long interaction region 510 (e.g., which may correspond to a maximum or optimal interaction region length), such that the additional common interaction regions may be associated with modulation sensitivity voltages $V\pi_{common(1)}$, $V\pi_{common(2)}$ wherein $V\pi_{long} < V\pi_{common(1)} < V\pi_{common(2)}$.

Figure 5B:
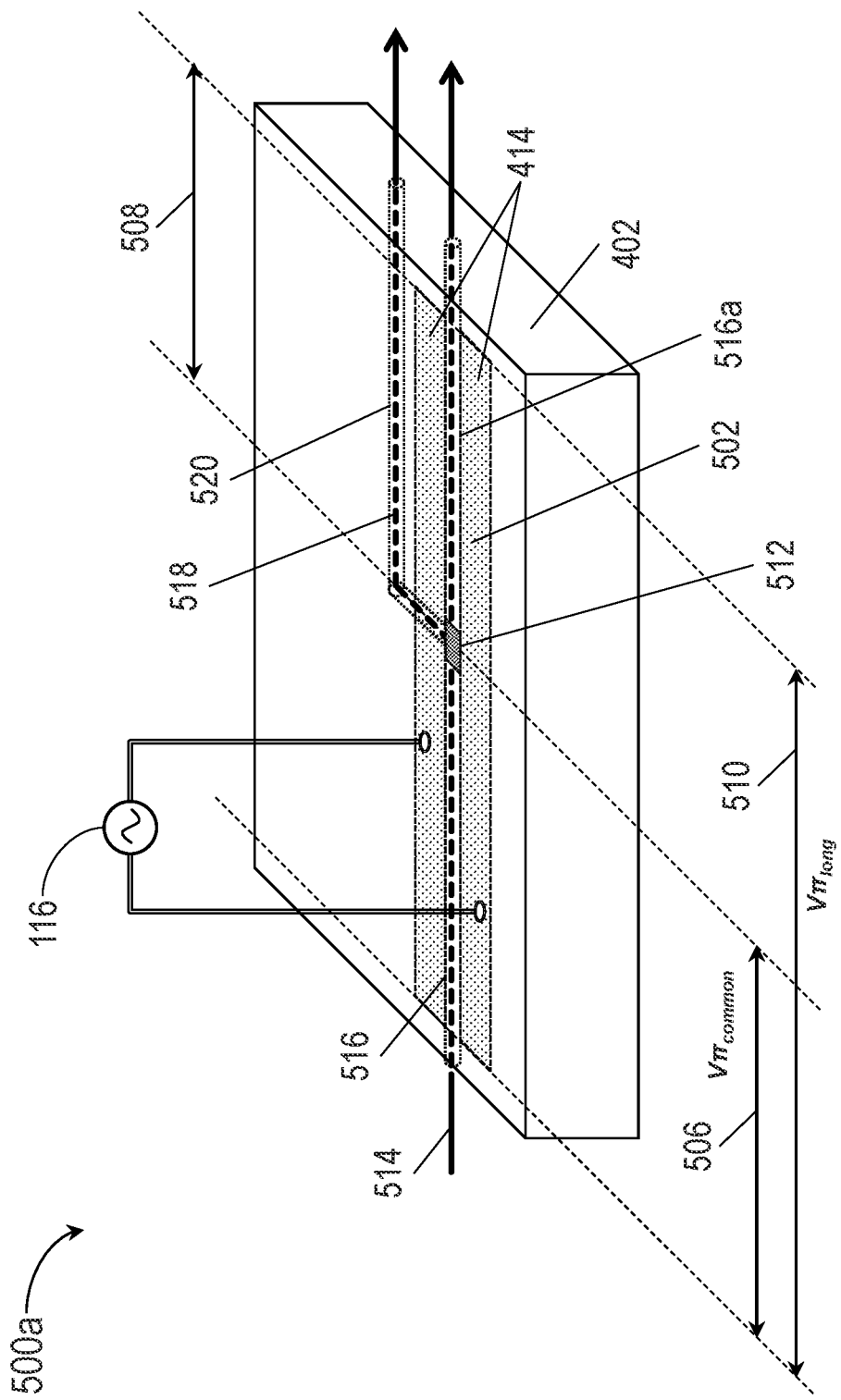

Referring also to FIG. 5B, the system 500a for multiple-sensitivity optical phase modulation may function similarly to the system 500 shown by FIG. 5A, except that the system 500a may incorporate an optical splitter 512 within the common interaction region 506. In embodiments, a single optical carrier 514 may be carried by an optical mode 516 proximate to the appropriate electrical field defining the common interaction region 506. The optical splitter 512 may divide the optical carrier 514 into two branches; for example, the optical carrier 514 may continue through the long interaction region 510 via the optical mode 516a (e.g., defining a modulation sensitivity voltage $V\pi_{long}$ as described above with respect to FIG. 5A) while the optical carrier 518 may be carried outside the common interaction region 506 by the optical mode 520 (e.g., defining a modulation sensitivity voltage $V\pi_{common}$, wherein $V\pi_{long} < V\pi_{common}$, as described above).

Figure 6A:
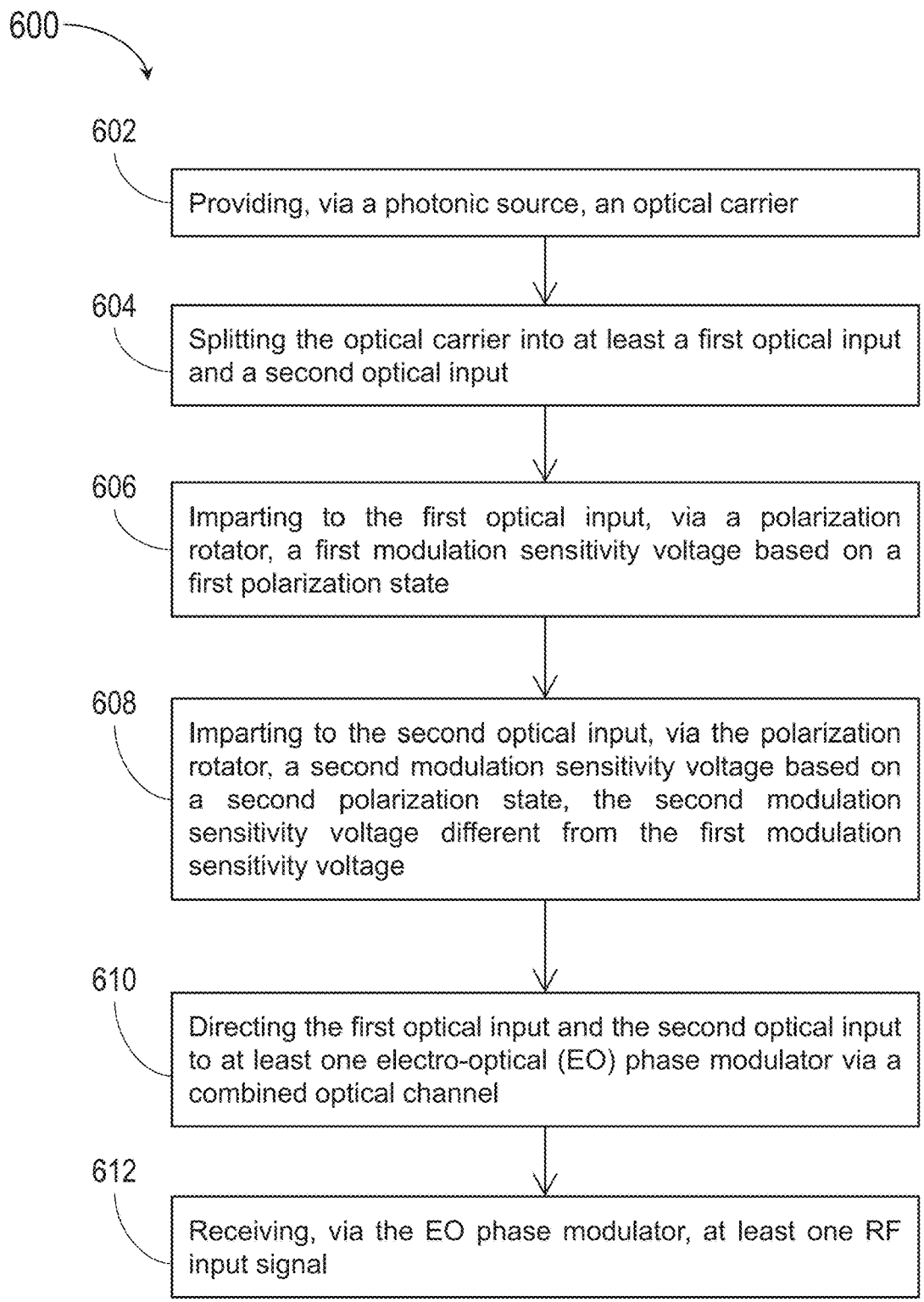

Referring now to FIG. 6A, the method 600 may be implemented by the multiple-sensitivity optical modulation systems 100, 200, 300 and may include the following steps.

At a step 602, a photonic source provides an optical carrier.

At a step 604, the optical carrier is split into at least a first and a second optical input.

At a step 606, a sensitivity controller (e.g., a polarization beam splitter) isolates from the optical carrier a first optical output and imparts to the first optical input a first modulation sensitivity voltage based on a first polarization state (e.g., a horizontal or vertical polarization state).

At a step 608, the polarization rotator imparts a different modulation sensitivity voltage to the second optical input, e.g., different from the first modulation sensitivity voltage and based on a different polarization state.

At a step 610, an electro-optical (EO) phase modulator receives the first and second optical input from the polarization rotator via a combined-polarization optical channel incorporating two different polarization states. In some embodiments, the phase modulator receives combined-polarization optical channels in opposing optical path directions.

At a step 612, the EO phase modulator receives at least one RF input signal of interest.

Referring also to FIG. 6B, at a step 614, the EO phase modulator modulates a phase of the first optical input based on the RF input signal according to a first modulation sensitivity voltage. For example, the first modulation sensitivity voltage may correspond to the first optical path direction, or to the first polarization (horizontal or vertical). In some embodiments, the first optical input is a combined-polarization optical channel sent in an optical path direction, wherein each optical input component is phase-modulated according to two modulation sensitivity voltages (e.g., the same path direction+different polarization states).

At a step 616, the EO phase modulator modulates a phase of the second optical input based on the RF input signal according to a second modulation sensitivity voltage different from the first modulation sensitivity voltage. For example, the second modulation sensitivity voltage may correspond to the opposing optical path direction, or to the opposing polarization (vertical or horizontal). In some embodiments, the second optical input is a combined-polarization optical channel sent in an optical path direction opposite or different from the first optical path direction, wherein each optical input component is phase-modulated according to two modulation sensitivity voltages (e.g., the same path direction+different polarization states).

At a step 618, the modulated first or second optical inputs are directed to a photonic processor. In some embodiments, the optical circulators respectively direct modulated optical inputs in optical path directions opposing or different from the direction of unmodulated optical inputs toward the EO phase modulator. In some embodiments, the combined optical channels (e.g., where multiple components are phase-modulated according to different modulation sensitivity voltages based on different polarization states) are separated by polarization beam splitters into their component modulated optical inputs and directed via separate optical channels to the photonic processor.

Figure 7:
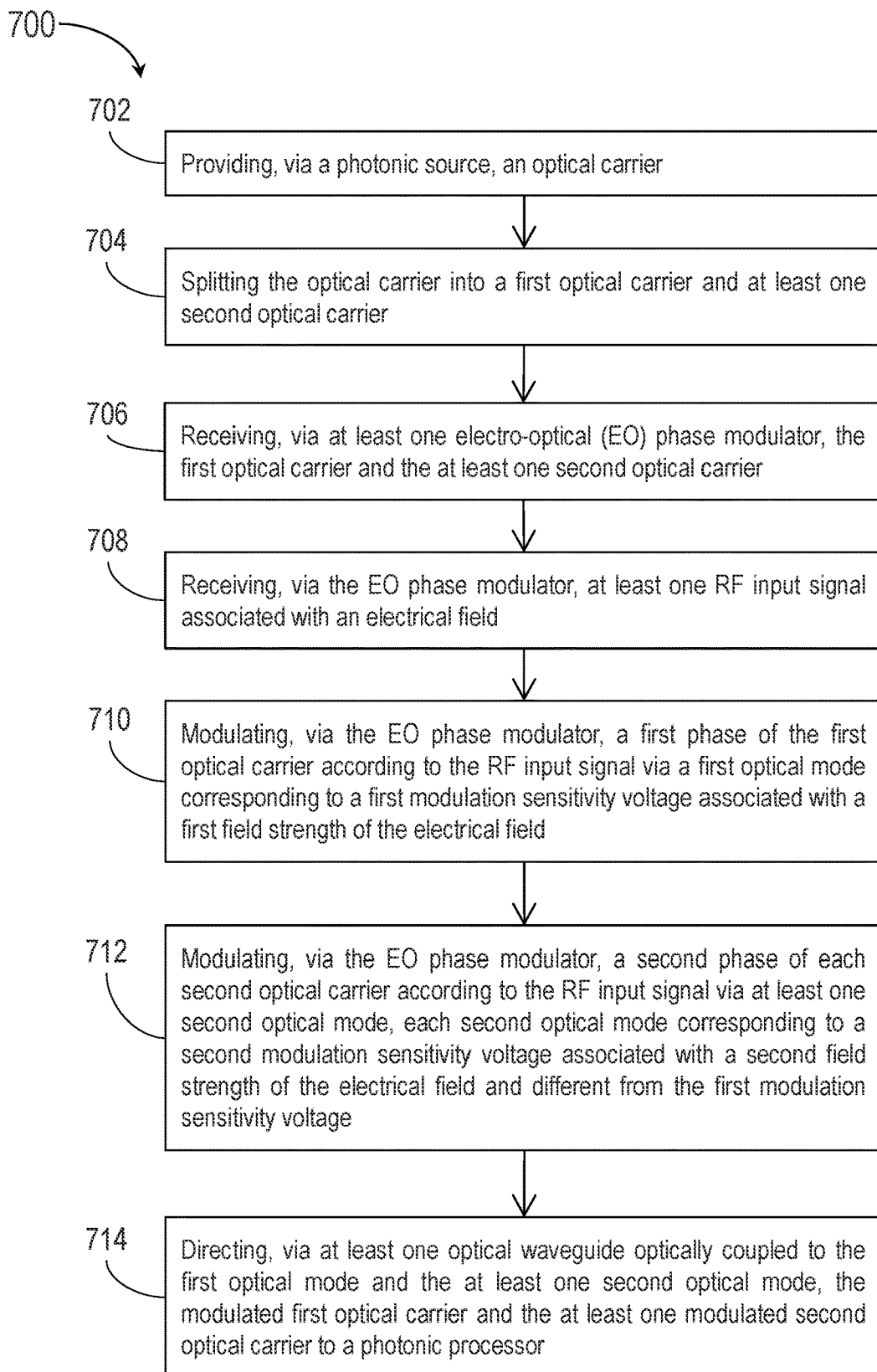
FIG. 7 is a flow diagram illustrating a method for multiple-sensitivity optical phase modulation according to example embodiments of this disclosure.

Referring now to FIG. 7, the method 700 may be implemented by the multiple-sensitivity optical modulation systems 400, 500 and may include the following steps. At a step 702, a photonic source provides an optical carrier.

At a step 704, an optical splitter separates the optical carrier into two optical copies. In some embodiments, the optical splitter is located within an interaction region wherein the optical field associated with the optical carrier and an electrical field overlap, e.g., splitting the optical carrier into a first carrier that continues (e.g., via the first optical mode) through the interaction region (continuing to overlap with the electrical field) and a second carrier that exits the interaction region (e.g., via a second optical mode), having no further overlap with the electrical field.

At a step 706, an EO phase modulator receives both optical copies, e.g., a first optical copy via a first optical mode and a second optical copy via a second optical mode.

At a step 708, the EO phase modulator receives an RF signal of interest. For example, the RF signal of interest generates an RF electrical field with which the optical fields associated with the first and second optical copies overlap with and/or interact.

At a step 710, the EO phase modulator modulates a phase of a first optical copy according to the RF input signal based on a first modulation sensitivity voltage associated with the first optical mode. In some embodiments, the first optical mode may define an optimal strength of the electrical field associated with a minimal sensitivity voltage. In some embodiments, the first optical mode defines an optimal length of electro-optical field interaction (and thus a minimal sensitivity voltage).

At a step 712, the EO phase modulator modulates a phase of a second optical copy according to the RF input signal based on a second modulation sensitivity voltage associated with the second optical mode, the second modulation sensitivity voltage different from the first modulation sensitivity voltage. In some embodiments, at least one second optical mode is placed at a location of off-nominal or sub-optimal electrical field strength, and thus associated with a higher sensitivity voltage than the first (e.g., optimally placed) optical mode. In some embodiments, at least one second optical mode defines a shorter electro-optical field interaction length than the first optical mode (and thus a higher sensitivity voltage).

At a step 714, optical waveguides direct the modulated first optical carrier and the at least one modulated second optical carrier to a photonic processor.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for polarization-dependent multiple-sensitivity optical phase modulation, comprising:

a photonic source configured to provide an optical carrier;

an optical splitter configured to provide, based on the optical carrier, at least a first optical input and a second optical input;

at least one polarization rotator optically coupled to the optical splitter, the at least one polarization rotator configured to:
  impart to the first optical input a first modulation sensitivity voltage based on a first polarization state;
  impart to the second optical input a second modulation sensitivity voltage different from the first modulation sensitivity voltage, the second modulation sensitivity voltage based on a second polarization state;
  and
  output the first optical input and the second optical input as a combined optical channel:

at least one electro-optical (EO) phase modulator optically coupled to the first sensitivity controller, the EO phase modulator configured to:
  receive the first optical input and the second optical input;
  receive at least one radio frequency (RF) input signal;
  modulate a first phase of the first optical input according to the RF input signal and the first modulation sensitivity voltage;
  and
  modulate a second phase of the second optical input according to the RF input signal and the second modulation sensitivity voltage;

and at least one polarization beamsplitter optically coupled to the EO phase modulator, the at least one polarization beamsplitter configured to
  separate the modulated first optical input and the modulated second optical input;
  and
  direct the modulated first optical input and the modulated second optical input to at least one photonic processor.

2. The system of claim 1, wherein the first polarization state is a vertical polarization state and the second polarization state is a horizontal polarization state.

3. The system of claim 1, wherein the at least one combined optical channel includes a first combined optical channel associated with a first optical path direction and a second combined optical channel associated with a second optical path direction, further comprising:

at least one first optical circulator configured to 1) impart to the first combined optical channel a third modulation sensitivity voltage associated with the first optical path direction and 2) direct the first combined optical channel through the EO phase modulator in the first optical path direction;

at least one second optical circulator configured to 1) impart to the second combined optical channel a fourth modulation sensitivity voltage associated with the second optical path direction and 2) direct the second combined optical channel through the EO phase modulator in the second optical path direction;

wherein the at least one EO phase modulator is configured to modulate at least one phase of the first combined optical channel and the second combined optical channel;

and wherein the at least one polarization beamsplitter includes:

at least one first beamsplitter optically coupled to the first optical circulator and configured to separate the modulated second combined optical channel into 1) a first optical output phase-modulated according to the RF input signal and the first and fourth modulation sensitivity voltages and 2) a second optical output phase-modulated according to the RF input signal and the second and fourth modulation sensitivity voltages;
and
at least one second beamsplitter optically coupled to the second optical circulator and configured to separate the modulated first combined optical channel into 1) a third optical output phase-modulated according to the RF input signal and the first and third modulation sensitivity voltages and 2) a fourth optical output phase-modulated according to the RF input signal and the first and fourth modulation sensitivity voltages.

4. The system of claim 1, further comprising:
the photonic processor, wherein the photonic processor is configured to:
receive at least the modulated first optical input and the modulated second optical input;
and
generate one or more processed modulated optical outputs based on the modulated first optical input and the modulated second optical input;
and
at least one photodiode optically coupled to the photonic processor, the at least one photodiode configured to convert the one or more processed modulated optical outputs into one or more modulated output electrical signals.

5. A system for directional-dependent multiple-sensitivity optical phase modulation, comprising:
a photonic source configured to provide an optical carrier;
an optical splitter configured to provide, based on the optical carrier, at least a first optical input and a second optical input;
at least one first optical circulator optically coupled to the optical splitter and configured to impart to the first optical input a first modulation sensitivity voltage based on a first optical path direction;
at least one second optical circulator optically coupled to the optical splitter and configured to impart to the second optical input a second modulation sensitivity voltage based on the second optical path direction;
at least one electro-optical (EO) phase modulator optically coupled to the first sensitivity controller, the EO phase modulator configured to:
receive the first optical input and the second optical input;
receive at least one radio frequency (RF) input signal;
modulate a first phase of the first optical input according to the RF input signal and the first modulation sensitivity voltage;
and
modulate a second phase of the second optical input according to the RF input signal and the second modulation sensitivity voltage;
the at least one first optical circulator configured to:
receive the modulated second optical input from the EO phase modulator in a second optical path direction different from the first optical path direction;
and
direct the modulated second optical input to at least one photonic processor:
and
the at least one second optical circulator configured to:
receive the modulated first optical input from the EO phase modulator in the first optical path direction:
and
direct the modulated first optical input to the at least one photonic processor.

6. The system of claim 5, further comprising:
the photonic processor, wherein the photonic processor is configured to:
receive at least the modulated first optical input and the modulated second optical input;
and
generate one or more processed modulated optical outputs based on the modulated first optical input and the modulated second optical input;
and
at least one photodiode optically coupled to the photonic processor, the at least one photodiode configured to convert the one or more processed modulated optical outputs into one or more modulated output electrical signals.

7. A method for polarization-dependent multiple-sensitivity optical phase modulation, the method comprising:
providing, via a photonic source, an optical carrier;
splitting the optical carrier into at least a first optical input and a second optical input;
imparting to the first optical input, via a polarization rotator, a first modulation sensitivity voltage based on a first polarization state;
imparting to the second optical input, via the polarization rotator, a second modulation sensitivity voltage based on a second polarization state, the second modulation sensitivity voltage different from the first modulation sensitivity voltage;
directing the first optical input and the second optical input to
at least one electro-optical (EO) phase modulator via a combined optical channel;
receiving, via the EO phase modulator, at least one RF input signal;
modulating, via the EO phase modulator, a first phase of the first optical output according to the RF input signal and the first modulation sensitivity voltage;
modulating, via the EO phase modulator, a second phase of the second optical output according to the RF input signal and the second modulation sensitivity voltage;
and
directing the modulated first optical output and the modulated second optical output to a photonic processor.

8. The method of claim 7, wherein the at least one combined optical channel includes at least a first and a second combined optical channel, and directing the modulated first optical output and the modulated second optical output to a photonic processor includes:
separating, via a polarization beamsplitter, at least one of the first modulated combined optical channel or the second modulated combined optical channel into a first optical output and a second optical output.

9. The method of claim 7, further comprising:
generating, via the at least one photonic processor, one or more processed modulated optical outputs;

and converting, via at least one photodiode, the one or more processed modulated optical outputs into one or more modulated output electrical signals.

10. A method for directional-dependent multiple-sensitivity optical phase modulation, the method comprising:

providing, via a photonic source, an optical carrier;

splitting the optical carrier into at least a first optical input and a second optical input;

imparting to the first optical input, via a first optical circulator, the first modulation sensitivity voltage to the first optical based on a first optical path direction;

imparting to the second optical input, via a second optical circulator, the second modulation sensitivity voltage based on a second optical path direction different from the first optical path direction;

receiving, via at least one electro-optical (EO) phase modulator, the first optical input and the second optical input;

receiving, via the EO phase modulator, at least one RF input signal;

modulating, via the EO phase modulator, a first phase of the first optical output according to the RF input signal and the first modulation sensitivity voltage;

modulating, via the EO phase modulator, a second phase of the second optical output according to the RF input signal and the second modulation sensitivity voltage;

receiving in the second optical path direction, via the first optical circulator, the modulated second optical input; and receiving in the first optical path direction, via the second optical circulator, the modulated first optical input; and directing, via the first and second optical circulators, the modulated first optical output and the modulated second optical output to a photonic processor.

11. The method of claim 10, further comprising:

generating, via the at least one photonic processor, one or more processed modulated optical outputs; and converting, via at least one photodiode, the one or more processed modulated optical outputs into one or more modulated output electrical signals.

* * * * *